(No Model.)
T. F. BERGMANN.
ASSAYING GLASS FOR TESTING WINE.
No. 397,961. Patented Feb. 19, 1889.
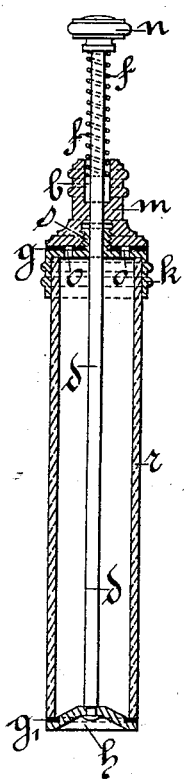
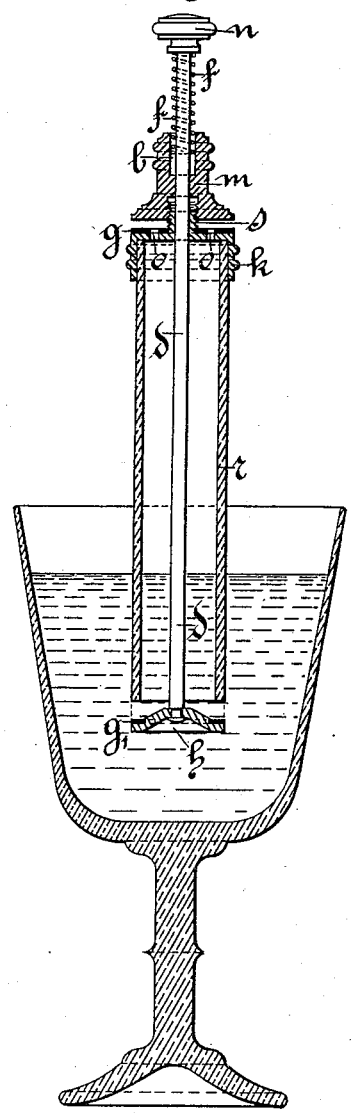
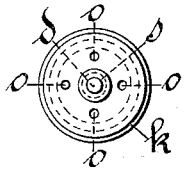
Witnesses:
John M. Speer.
T. F. Bourne.
Inventor:
Theodor Friedrich Bergmann.
by Briesen, Steele & Knauth
Attorneys.

United States Patent Office.

THEODOR FRIEDRICH BERGMANN, OF LILIENSTEIN, NEAR KÖNIGSTEIN, SAXONY, GERMANY.

ASSAYING-GLASS FOR TESTING WINE.

SPECIFICATION forming part of Letters Patent No. 397,961, dated February 19, 1889.

Application filed October 10, 1888. Serial No. 287,721. (No model.)

*To all whom it may concern:*

Be it known that I, THEODOR FRIEDRICH BERGMANN, landlord, of Lilienstein, near Königstein, a subject of the Emperor of Germany, residing at Lilienstein, in the Kingdom of Saxony, Germany, have invented certain new and useful Improvements in Assaying-Glasses for Proving Wine as to its Purity and Genuineness; and I do hereby declare the following to be a full, clear, and exact description of the invention, such as will enable others skilled in the art to which it appertains to make and use the same.

This apparatus easily serves the purpose of assaying wine as to its purity and genuineness.

Reference is to be had to the accompanying drawings, in which—

Figure 1 is a longitudinal section of my assaying-glass, the same being closed. Fig. 2 is a similar view of the same opened and inserted in a wine-glass, and Fig. 3 is a top view of the cap.

This apparatus consists of a glass tube, $r$, on one end of which is secured a metal cap, $k$. The cap $k$ is provided with a threaded stem, $s$, through which passes a rod, $d$, which also passes to the lower end of the tube $r$.

To the upper outer end of the rod $d$ is secured a button, $n$, and on the lower end of the rod is a cap, $h$, that is adapted to close the glass tube $r$ at its lower end.

The cap $k$ is provided with one or more holes, $o$, which permit the escape of air from the glass tube, $r$. On the upper side of the cap $k$ is a rubber ring, $g$. A cover, $m$, screws on the stem $s$ and covers over the holes, and rests on or carries the ring $g$, so as to close the openings $o$. By raising the cover $m$ the holes $o$ are uncovered and air is permitted to escape from and enter the tube $r$. The rod $d$ passes through the cover $m$ and has longitudinal movement therein. The cap $h$ carries a rubber ring, $g'$, which serves to tightly close the lower end of the glass tube $r$. $f$ is a spring that surrounds the rod $d$ and presses at one end against the button $n$ and at its other end against the cover $m$. The upward pressure of the spring $f$ moves the rod $d$ upward, thereby pressing the cap $h$ or its ring $g'$ against the lower end of the tube $r$, thereby closing the tube.

In order to assay any wine with this apparatus, the cover $m$ is to be loosened, so that the air in the tube $r$ can escape through the holes $o$. The cap $h$ is next moved away from contact with the tube $r$ by pressing on the button $n$, which lowers the rod $d$ and cap $h$. The apparatus is thereupon immersed in the wine to be assayed, as represented in Fig. 2. As soon as sufficient wine has entered the apparatus the same is closed below as well as above by the cap $h$ and the cover $m$, and is taken out of the wine and thereupon passed into a glass containing clear water. The cap $h$ is now moved from the tube $r$ to open the lower end of the same, while the holes $o$ above are kept closed, whereby neither air nor water can enter the apparatus, nor wine from the apparatus can enter the water.

If the wine be adulterated or mixed, the coloring or other foreign matter mixed up with the same will dissolve by contact with the water and color it, as the wine is directly contacted with the water through the lower opening; but if the wine be pure and not adulterated the water keeps perfectly clear, as pure alcoholic liquids are lighter than water.

This apparatus can be made of any size wished for, so that the same may easily be carried in the pocket.

Having thus described my invention, what I claim is—

In an assaying-glass for proving the purity and genuineness of wine, the tube $r$, perforated cap $k$, carried by said tube and apertured, threaded stem $s$, and the cover $m$, that is carried by the stem $s$ and adapted to close the apertures in the cap, combined with the rod $d$, that passes through the cover $m$, cap $k$, and tube $r$, spring $s$, button $n$, and cap $h$, carried by the rod $d$, substantially as described.

In testimony whereof I affix my signature in presence of two witnesses.

THEODOR FRIEDRICH BERGMANN.

Witnesses:
 CARL FR. REICHELT,
 PAUL DRUCKMÜLLER.